United States Patent [19]
Kitagawa

[11] Patent Number: 6,117,227
[45] Date of Patent: Sep. 12, 2000

[54] ASPHALT PAVING MIX FORMED OF RECYCLED ASPHALT CONCRETE AND NEW ASPHALT FOR PAVING AT AMBIENT TEMPERATURES AND A PROCESS FOR MAKING THE SAME

[75] Inventor: Terutaka Kitagawa, Kyoto, Japan

[73] Assignee: Hikarigiken Co., Ltd., Kyoto, Japan

[21] Appl. No.: 09/368,384

[22] Filed: Aug. 4, 1999

Related U.S. Application Data

[63] Continuation-in-part of application No. 09/293,045, Apr. 16, 1999.

[30] Foreign Application Priority Data

Apr. 28, 1998 [JP] Japan .................. 10-156604

[51] Int. Cl.$^7$ .................................. C09D 195/00
[52] U.S. Cl. ........................ 106/284.01; 106/280
[58] Field of Search ................. 106/280, 284.01

[56] References Cited

U.S. PATENT DOCUMENTS 4,000,000  12/1976  Mendenhall ........................ 106/280

FOREIGN PATENT DOCUMENTS 54-21419   2/1979   Japan .
2-91303    3/1990   Japan .

*Primary Examiner*—David Brunsman
*Attorney, Agent, or Firm*—Christensen O'Connor Johnson & Kindness PLLC

[57] ABSTRACT

An improved asphalt mix and a process for making the same are disclosed. The asphalt mix includes aggregate grains, new asphalt, and additive oil. The aggregate grains are obtained from crushing recycled asphalt concrete at an ambient temperature to such an extent that each aggregate grain will retain recycled asphalt on its surface. The new asphalt is heated and is mixed with the additive oil. The additive oil is preferably hydrocarbon oil having a low vapor pressure so as to be practically nonvolatile. The additive oil also has mutual solubility with asphalt. The mixture of the new asphalt and the oil is then mixed with the aggregate grains at an ambient temperature so that the mixture will cover the surfaces of the aggregate grains, and the recycled asphalt on the surfaces of aggregate grains will swell by absorbing the oil. The recycled asphalt on the grains is sufficiently swollen so as to amalgamate together when the asphalt mix is compacted at ambient temperatures to form a pavement. The asphalt concrete formed of the asphalt mix achieves sufficient strength immediately after compaction at an ambient temperature. The asphalt mix does not congeal easily and, thus, is suited for long-term storage.

27 Claims, No Drawings

ASPHALT PAVING MIX FORMED OF RECYCLED ASPHALT CONCRETE AND NEW ASPHALT FOR PAVING AT AMBIENT TEMPERATURES AND A PROCESS FOR MAKING THE SAME

CROSS-REFERENCE TO RELATED APPLICATIONS

This is a continuation-in-part application of U.S. patent application Ser. No. 09/293,045, filed Apr. 16, 1999, which is based on Japanese patent application Ser. No. 156604, filed Apr. 28, 1998.

FIELD OF THE INVENTION

The present invention relates to an asphalt paving mix suitable for use at ambient temperatures and, more specifically, to an asphalt paving mix formed of recycled asphalt concrete, new asphalt, and practically nonvolatile additive oil.

BACKGROUND OF THE INVENTION

Some asphalt mixes have been proposed in the past that utilize recycled asphalt concrete and are suitable for use in paving at ambient temperatures. (See, for example, Japanese Patent Publication Serial No. 55-19268 (1980). These asphalt mixes are formed by crushing recycled asphalt concrete into aggregate grains to such an extent that each aggregate grain will still retain asphalt on its surface; adding to the aggregate grains an appropriate amount of volatile oil, such as kerosene and light oil, and an appropriate amount of additives including both asphalt emulsion and liquid rubber, at an ambient temperature; and mixing them together. Thus, these asphalt mixes are based on the technical concept that, while these mixes would not congeal within a sealed container, once they are exposed to ambient air at a paving site the volatile oil evaporates to allow asphalt to congeal and harden to form a pavement.

These asphalt mixes are advantageous in that they may be formed without heat treatment during the adding and mixing of the additives to the aggregate grains, as described above, and also in that they may be applied easily at an ambient temperature to form a pavement. However, because the additives include liquid rubber, these mixes cannot harden immediately after their application at a paving site and, rather, take a considerable amount of time, often as long as a few months, before achieving a desired hardness. This presents the further disadvantage that the resulting pavement may be cracked or otherwise damaged prematurely before it achieves sufficient hardness and strength.

To achieve a sufficiently hard pavement surface immediately after paving, the amount of volatile oil to be added to the aggregate grains may be reduced, so as to allow the asphalt to congeal more easily. This, however, makes it almost impossible to store the asphalt mixes, since volatile oil tends to evaporate over time causing the mixes to congeal and lump together. Lumped and solidified mixes thus become unusable later on, when they are to be applied to form a pavement.

Some other asphalt mixes have been also proposed in the past that include a special additive (chemical substance) to cause a polycondensation reaction, so as to increase the hardness of the resulting asphalt pavement after it is solidified. (See, for example, Japanese Patent Publications Serial Nos. 63-137959 (1988) and 2-228363 (1990).) Production of such special additives, however, is extremely cumbersome and expensive, and the strength of the resulting asphalt pavement cannot be expected to improve substantially.

A need exists for an improved asphalt mix that may be applied to form or repair a pavement at an ambient temperature, which can be stored for a long time, and is capable of achieving sufficient strength and stability immediately after its application at a paving site. Such asphalt mix preferably does not require a special additive formed of expensive chemical substances.

SUMMARY OF THE INVENTION

The present invention provides an improved asphalt mix and a process for making the same, which overcome all of the disadvantages associated with the prior art asphalt mixes as described above. The asphalt mix includes aggregate grains, new asphalt, and additive oil. The aggregate grains are obtained from crushing recycled asphalt concrete at an ambient temperature to such an extent that each aggregate grain will retain recycled asphalt on its surface. The new asphalt is heated (for example, 130° C. to 200° C.) and is mixed with the additive oil. The additive oil is preferably a hydrocarbon oil, has a low vapor pressure so as to be practically nonvolatile, and also has mutual solubility with asphalt. The temperature of the mixture of the additive oil and the new asphalt is below approximately 100° C., preferably closer to an ambient temperature. When the temperature is above 100° C., the mixture is cooled to below approximately 100° C., preferably closer to ambient temperatures. The mixture is then added to the aggregate grains at an ambient temperature to form the asphalt mix. When the aggregate grains and the mixture of the additive oil and the new asphalt are mixed together at an ambient temperature so that the mixture will cover the surfaces of the aggregate grains, the recycled asphalt on the surfaces of aggregate grains swells by absorbing the oil to such an extent that, when the asphalt mix is firmly compacted at ambient temperatures, the recycled asphalt on each of the aggregate grains will amalgamate together to form a stable paving surface.

Thus, the asphalt mix of the present invention is suitable for application at ambient temperatures, and achieves sufficient strength immediately after its paving application at an ambient temperature. The asphalt mix does not congeal easily, so it is well suited for long-term storage.

DETAILED DESCRIPTION OF THE PREFERRED EMBODIMENT

The present invention provides an improved asphalt mix. The mix includes aggregate grains obtained from crushing recycled asphalt concrete at an ambient temperature to such an extent that each aggregate grain will retain recycled asphalt on its surface. The mix further includes new asphalt. The mix also includes additive oil having a low vapor pressure so as to be practically nonvolatile. The additive oil has mutual solubility with asphalt. The new asphalt is heated (for example, 130° C. to 200° C.), and is mixed with the additive oil. The temperature of the mixture of the heated new asphalt and the additive oil is typically below approximately 100° C., preferably closer to ambient temperature. When the temperature of the mixture is above 100° C., the mixture is cooled to below approximately 100° C. Thereafter, the aggregate grains and the mixture of the additive oil and the new asphalt are mixed together at an ambient temperature so that the mixture will cover the surfaces of the aggregate grains. At this point, the recycled asphalt on the surfaces of aggregate grains swells by absorbing the oil. When the asphalt mix thus formed is compacted at an ambient temperature, the swollen recycled asphalt on the grains will amalgamate together to instantly form a stable paving surface.

The aggregate grains are obtained by crushing recycled asphalt concrete, wherein each grain is sufficiently sized to retain some recycled asphalt on its surface. Because the asphalt on these recycled aggregate grains is typically aged by weathering, it is stiffer than virgin asphalt. When the mixture of the new asphalt and the prescribed amount of the oil is added at ambient temperatures, the stiffened recycled asphalt swells by absorbing the oil. When the asphalt mix comprising the aggregate grains covered with thus swollen recycled asphalt is compacted at an ambient temperature, an adequately hard and stable paving surface is achieved instantly.

The additive oil to be mixed with the aggregate grains has a mutual solubility with asphalt so that aged, weathered recycled asphalt covering the surfaces of the grains can be swollen gradually. Further, the additive oil is practically nonvolatile so that the swollen state of the asphalt can be maintained for a long period, without causing the asphalt on the grains to congeal together. Preferably, the additive oil has a flashpoint of 200° C. or higher.

The additive oils suitable for use in the present invention include petroleum hydrocarbons, animal/plant oils and fats, synthetic hydrocarbons, and synthetic esters. However, animal/plant oils and fats may not be preferable since they are subject to various adverse reactions and also tend to deteriorate easily. Also, synthetic hydrocarbons and esters may not be preferable since they are both relatively expensive. Thus, petroleum hydrocarbons are preferable. Further preferably, heavy hydrocarbon oil having a flashpoint higher than approximately 200° C. is suitable for use.

To achieve uniform mixing of the aggregate grains, the new asphalt, and the additive oil, it may be preferable to use additive oil having a lower viscosity. The viscosity of the additive oil also affects the degree of asphalt swelling. Considering these factors, it has been found that additive oil having a kinematic viscosity of between approximately 30 and 200 (cSt. at 40° C.) is preferable for use in accordance with the present invention.

The mixing ratio of the new asphalt and the additive oil is approximately between 2:8 and 6:4, and preferably approximately 5:5 by weight. To increase the ratio of the new asphalt, it may be advantageous to increase the temperature of the new asphalt when mixing it with the additive oil.

The amount of additive oil to be added is also determined based on the amount of the recycled asphalt retained on the surfaces of the aggregate grains. When too much additive oil is used relative to the amount of asphalt on the grains, the recycled asphalt will swell and soften excessively, thereby reducing the mutual cohesiveness between aggregate grains and, thus, weakening the strength of a resulting pavement. If too little additive oil is added, the recycled asphalt will not swell sufficiently, thereby also preventing adequate bonding between the aggregate grains even after firm compaction.

The swelling of the recycled asphalt on the grain surfaces should be sufficient to allow the swollen asphalt on each grain surface to intermingle with, and adhere to the swollen asphalt on adjacent grain surfaces when the asphalt mix is firmly compacted. Thus, when the asphalt mix comprising the asphalt swollen with additive oil is applied on a roadbed and is compacted by rolling or vibration at ambient temperatures, the aggregate grains compact themselves together, eliminating any space therebetween and further deforming and bonding together the swollen asphalt on the grain surfaces. Thus, the swollen asphalt functions as a binder to bond the aggregate grains firmly together, to create a paving surface having sufficient hardness immediately after the completion of paving.

It has been found that aggregate grains sized to pass through a 13 mm sieve, which is a standard grain size as prescribed by the Japanese Highway Association Corporation, work well in the present invention. As a matter of convenience in accordance with the Japanese standard for the purpose of the present discussion, it may be practical to categorize the aggregate grain sizes into three groups by sieving: grains remaining on a 13 mm sieve; grains passing through a 13 mm sieve but remaining on a 0.6 mm sieve; and grains passing through a 0.6 mm sieve. The recycled asphalt content (% in weight) of the aggregate grains, obtained from crushing recycled asphalt concrete, depends on the grain size, and smaller grains typically have a larger content of asphalt (% in weight), and vice versa.

The performance or quality of the asphalt mix of the present invention depends on the total amount of asphalt (both new and recycled) included within the mix. If there is too little asphalt, the mix will produce an asphalt concrete with insufficient strength, which easily crumbles or cracks. On the other hand, if too much asphalt is included in the mix, the resulting asphalt concrete will not have sufficient strength due to excessive plasticity.

Therefore, the total amount of asphalt to be included in the mix should be determined based on the desired performance quality of the asphalt mix. Preferably, asphalt of approximately 4 to 6% by weight of the total weight of the asphalt mix is used. To achieve such preferable ratio, one may selectively mix aggregate grains that can pass through a 13 mm sieve but cannot pass through a 0.6 mm, and aggregate grains that can pass through a 0.6 mm sieve. Further, one may selectively determine the amount of the new asphalt to be added to the asphalt mix, depending on how much recycled asphalt is retained on the surfaces of the aggregate grains obtained from crushing a particular piece of recycled asphalt concrete. It has been found that the amount of the mixture of the new asphalt and the oil should comprise approximately 0.5 to 3.5%, preferably between 1.0 and 2.0%, by weight of the total weight of the asphalt mix to achieve a high-quality asphalt mix. If desired, color additives such as carbon black of approximately 0.01 to 0.1% by weight of the total mix weight may be added for coloring purposes.

Optionally, calcium carbonate ($CaCO_3$) powder may be added as a filler. Calcium carbonate is believed to increase the strength of resulting asphalt concrete after compaction and, also, to help prevent solidification of asphalt mix during storage. Preferably, the calcium carbonate is added after the recycled asphalt on the surfaces of the aggregate grains is swollen with the oil. The amount of calcium carbonate powder to be added is preferably between approximately 1.0 and 10.0% by weight, and further preferably between approximately 3.0 and 5.5% by weight, of the total weight of the asphalt mix. Since calcium carbonate is used as a filler, one may wish to increase its amount when there is a lesser amount of relatively smaller sized recycled aggregate grains that may serve as a filler.

The present invention also provides a process of forming the asphalt mix of the present invention as described above. Specifically, the process first crushes recycled asphalt concrete into aggregate grains at an ambient temperature, to such an extent that each aggregate grain will be sized so as to retain recycled asphalt on its surface. The process then provides heated new asphalt. The heated new asphalt is mixed with a prescribed amount of additive oil, wherein the oil has a low vapor pressure so as to be practically nonvolatile and also has mutual solubility with asphalt. The temperature of the mixture of the heated new asphalt and the additive oil is typically below approximately 100° C. at this point, preferably closer to ambient temperature. When the temperature of the mixture is above 100° C., the mixture is cooled to below approximately 100° C. The process thereafter mixes the mixture of the new asphalt and the oil with the aggregate grains at an ambient temperature, so that the mixture will cover the surfaces of the aggregate grains, and the recycled asphalt on the aggregate grains will swell by absorbing the additive oil included in the mixture. The recycled asphalt on the aggregate surfaces is swollen so as to allow the recycled asphalt to amalgamate together when the asphalt mix is compacted at an ambient temperature, to form a pavement.

Application of the asphalt mix produced in accordance with the present invention at a paving site includes preparing the asphalt mix of the present invention, applying the asphalt mix on a surface to be paved at ambient temperatures, and compacting the asphalt mix at ambient temperatures. The compaction may be performed by rolling, vibration, or using any other suitable means to apply pressure. Optionally, asphalt emulsion may be applied on the surface to be paved, prior to application of the asphalt mix thereto, so as to function as a glue between the surface and the asphalt mix.

As hereinbefore described, the present invention provides an improved asphalt mix for paving at ambient temperatures. Because the major portion (more than approximately 90% by weight) of materials used to form the mix is supplied by crushing and sieving recycled asphalt concrete, the present invention saves natural resources. Further, the present asphalt mix is environmentally friendly, since the additive oil used has a very low vapor pressure so as to be practically nonvolatile and, thus, the only volatile matter that may evaporate after application of the mix at a paving site will be practically none other than moisture. The asphalt mix of the present invention is suitable for forming asphalt concrete, which obtains sufficient stability instantly after compaction at ambient temperatures and, also, is suitable for long-term storage.

EXAMPLE

Large lumps of recycled asphalt concrete were crushed into midsized blocks (less than 1000 mm in diameter), and were further reduced in size, using an impeller breaker, into grains that mostly passed a 13 mm sieve. The grains are then divided by sieving into three fractions: (1) grains remaining on a 13 mm sieve; (2) a coarse fraction (grains passing through a 13 mm sieve but remaining on a 0.6 mm sieve); and (3) a fine fraction (grains passing through a 0.6 mm sieve). The coarse fraction was predominant in the obtained aggregate grains, and its asphalt content was approximately 3.8 to 4.8% by weight of the total weight of the grains of the fraction.

One ton of each of the coarse fraction Samples 1 through 10 was introduced individually into a batch-type mixer of 1 ton capacity, and was agitated vigorously, while spraying a prescribed amount of the prepared mixture of new asphalt and additive oil.

During mixing, calcium carbonate ($CaCO_3$) powder was optionally added as a filler.

Table 1 shows the detailed composition of the prepared ten asphalt mixes. The Marshall stability test (ASTM D 1559-71) was performed on respective pavement specimens created with Samples 1 through 10, and the results are shown in Table 1. One kilogram of each sample mix was rammed 50 times from one end, inverted, and again rammed 50 times from the other end in a specified cup, as prescribed in the Marshall stability test. The stability of the resulting test piece was then measured. According to the Marshall stability test, the test piece should be kept at 60° C. before measuring stability. However, since the asphalt mix formed in accordance with the present invention is suitable for paving application at ambient temperatures, the ten specimens shown in Table 1 were rammed immediately after the asphalt mixes were produced, and their stability was then measured at ambient temperatures.

In Table 1, the amount of the recycled aggregate grains, new asphalt, additive oil, and calcium carbonate ($CaCO_3$), are shown in percent by weight of the produced asphalt mix. The stability value in the table signifies a stability level in $kg/cm^2$.

TABLE 1

| | Recycled Aggregate Grains | New Asphalt | Additive Oil | $CaCo_3$ | Stability |
|---|---|---|---|---|---|
| 1 | 99.5 | 0.25 | 0.25 | — | 605 |
| 2 | 99.0 | 0.5 | 0.5 | — | 720 |
| 3 | 98.5 | 0.75 | 0.75 | — | 808 |
| 4 | 98.0 | 1.0 | 1.0 | — | 757 |
| 5 | 97.0 | 1.5 | 1.5 | — | 456 |
| 6 | 97.5 | 0.25 | 0.25 | 2 | 610 |
| 7 | 94.0 | 0.5 | 0.5 | 5 | 722 |
| 8 | 93.5 | 0.75 | 0.75 | 5 | 850 |
| 9 | 93.0 | 1.0 | 1.0 | 5 | 705 |
| 10 | 89.0 | 1.5 | 1.5 | 8 | 439 |

Table 1 shows that a stability level of as high as 808 $kg/cm^2$ (see No. 3) was achieved, even without addition of calcium carbonate ($CaCO_3$). Such stability level is sufficient to form a permanent pavement. The test specimens Nos. 5 and 10, which provide somewhat less stability, appear to be still effective for forming a provisional pavement. Test specimen No. 8, which comprises 93.5% recycled aggregate, 0.75% new asphalt, 0.75% additive oil, and 5.0% $CaCO_3$, all by weight, shows a stability level of 850 $kg/cm^2$. The results in Table 1 thus indicate that the asphalt mix of the present invention produces sufficiently strong and stable pavements.

For comparison purposes, the Marshall stability test was also conducted for asphalt concrete constructed from various prior art asphalt mixes comprising volatile oil and liquid rubber, which all indicated a stability level of approximately 100 $kg/cm^2$. In addition, some other commercially available prior art asphalt mixes have been tested using the Marshall stability test, all of which were formed using heat treatment and some of which included special additives (chemical substances having polymerization and/or condensation tendency). The Marshall stability levels were found to be 422, 370, and 350 $kg/cm^2$, respectively, for the mixes tested. Judging from these results, it appears that the prior art asphalt mixes are not suited for forming stable permanent pavements, though they may suffice for forming provisional pavements.

To test the storage characteristics of the asphalt mix produced in accordance with the present invention, 30 kg each of freshly produced asphalt mix, specimens Nos. 1–10, were packed in a paper sack, and the sacks were stacked into five-sack piles and sat at room temperature for three months. Although the asphalt mixes packed in these sacks seemed a little lumpy after three months, the lumps were quickly broken up by lightly pounding the outside of the sacks, and usable asphalt mixes were poured out easily. The asphalt mixes produced in accordance with the present invention and kept in sacks for three months showed stability levels equivalent to those demonstrated by newly prepared mixes. For comparison purposes, when other commercially available asphalt mixes were tested for their storage characteristics, most of them became extremely lumpy and solidified within two months and could not be poured out of their sacks.

While the preferred embodiments of the present invention have been illustrated and described, it will be appreciated that various changes can be made therein without departing from the spirit and scope of the invention.

The embodiments of the invention in which an exclusive property or privilege is claimed are defined as follows:

1. An asphalt mix suitable for forming a paving surface at an ambient temperature, comprising:

aggregate grains obtained from crushing recycled asphalt concrete at an ambient temperature, each aggregate grain being sized so as to retain recycled asphalt on its surface, new asphalt; and additive oil having a low vapor pressure so as to be practically nonvolatile, the oil having mutual solubility with asphalt;

wherein the recycled asphalt retained on the surfaces of the aggregate grains is swollen with the additive oil so as to amalgamate when the aggregate grains are compacted at an ambient temperature.

2. The asphalt mix of claim 1, wherein the additive oil is selected from the group consisting of petroleum hydrocarbons, animal/plant oils and fats, synthetic hydrocarbons, and synthetic esters.

3. The asphalt mix of claim 2, wherein the additive oil is heavy hydrocarbon oil having a flashpoint higher than approximately 200° C.

4. The asphalt mix of claim 1, wherein the additive oil has a kinematic viscosity ranging between approximately 30 and 200 (cSt. at 40° C.).

5. The asphalt mix of claim 1, wherein the additive oil has a flashpoint higher than approximately 200° C.

6. The asphalt mix of claim 1, wherein the aggregate grains can pass through a 13 mm sieve.

7. The asphalt mix of claim 1, wherein a total of the asphalt retained on the surfaces of the aggregate grains and the new asphalt comprises between approximately 4 and 6% by weight of the total weight of the asphalt mix.

8. The asphalt mix of claim 1, further comprising calcium carbonate powder of between approximately 1.0 and 10.0% by weight of the total weight of the asphalt mix.

9. The asphalt mix of claim 8, wherein the calcium carbonate powder comprises between approximately 3.0 and 5.5% by weight of the total weight of the asphalt mix.

10. The asphalt mix of claim 1, wherein the ratio of the new asphalt with respect to the additive oil is between approximately 2:8 and 6:4 by weight.

11. The asphalt mix of claim 10, wherein the ratio of the new asphalt with respect to the additive oil is approximately 5:5 by weight.

12. The asphalt mix of claim 1, wherein the new asphalt and the additive oil comprise between approximately 0.5 to 3.5% by weight of the total weight of the asphalt mix.

13. The asphalt mix of claim 12, wherein the new asphalt and the additive oil comprise between approximately 1.0 to 2.0% by weight of the total weight of the asphalt mix.

14. A process for making an asphalt mix suitable for forming a pavement surface at an ambient temperature, comprising the steps of:

crushing recycled asphalt concrete into aggregate grains at an ambient temperature, each aggregate grain being sized so as to retain recycled asphalt on its surface;

providing heated new asphalt;

mixing a prescribed amount of additive oil into the heated new asphalt, the oil having a low vapor pressure so as to be practically nonvolatile, the oil also having mutual solubility with asphalt;

mixing the aggregate grains and the mixture of the additive oil and the new asphalt at an ambient temperature, so that the mixture will cover the surfaces of the aggregate grains; and swelling the recycled asphalt on the surfaces of the aggregate grains with the oil so as to allow the recycled asphalt to amalgamate together when compacted at an ambient temperature.

15. The process of claim 14, further comprising the step of cooling the mixture of the additive oil and the heated new asphalt to below approximately 100° C.

16. The process of claim 14, wherein the additive oil is selected from the group consisting of petroleum hydrocarbons, animal/plant oils and fats, synthetic hydrocarbons, and synthetic esters.

17. The process of claim 16, wherein the additive oil is heavy hydrocarbon oil having a flashpoint higher than approximately 200° C.

18. The process of claim 14, wherein the additive oil has a kinematic viscosity ranging between approximately 30 and 200 (cSt. at 40° C.).

19. The process of claim 14, wherein the additive oil has a flashpoint higher than approximately 200° C.

20. The process of claim 14, wherein the new asphalt is heated to between approximately 130° C. and 200° C.

21. The process of claim 14, wherein the asphalt retained on the surfaces of the aggregate grains comprises between approximately 4 and 6% by weight of the total weight of the final asphalt mix.

22. The process of claim 14, further comprising the step of adding calcium carbonate powder of between approximately 1.0 and 10.0% by weight of the total weight of the asphalt mix.

23. The process of claim 22, wherein the calcium carbonate powder comprises between approximately 3.0 and 5.5% by weight of the total weight of the asphalt mix.

24. The process of claim 14, wherein the ratio of the new asphalt with respect to the additive oil is between approximately 2:8 and 6:4 by weight.

25. The process of claim 24, wherein the ratio of the new asphalt with respect to the additive oil is approximately 5:5 by weight.

26. The process of claim 14, wherein the new asphalt and the additive oil comprise between approximately 0.5 to 3.5% by weight of the total weight of the asphalt mix.

27. The process of claim 26, wherein the new asphalt and the additive oil comprise between approximately 1.0 to 2.0% by weight of the total weight of the asphalt mix.

* * * * *